(12) United States Patent
Firestone (10) Patent No.: US 6,247,072 B1
(45) Date of Patent: *Jun. 12, 2001

(54) REAL-TIME DATA RATE MATCHING ACROSS A MEDIUM

(75) Inventor: Scott Firestone, Menlo Park, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,866

(22) Filed: Jan. 27, 1998

(51) Int. Cl.$^7$ ..................................................... G06F 13/00
(52) U.S. Cl. ................................ 710/53; 710/29; 710/57; 709/233
(58) Field of Search .................................. 710/52, 53, 58, 710/60, 129, 57, 29; 709/233

(56) References Cited

U.S. PATENT DOCUMENTS

| | | | | |
|---|---|---|---|---|
| 4,893,326 | * | 1/1990 | Duran et al. ............................ | 379/53 |
| 5,481,543 | * | 1/1996 | Veltman ................................ | 370/94.1 |
| 5,659,799 | * | 8/1997 | Wu et al. .............................. | 395/877 |
| 5,825,771 | * | 10/1998 | Cohen et al. ......................... | 370/395 |

OTHER PUBLICATIONS

Precept Software Inc., "Multimedia Networking Software: A New Class of Client–Server Product Tailors Today's Packet Networks for Streaming Data," 8 pages, Jan., 1996, downloaded from WWW.

MBONE Resources, "The Mbone (or IP Multicast) Library for Reference and Documentation," 4 pages, Feb. 1997, downloaded from WWW.

Precept Software Inc.—Press Release, "Precept Unveils First General–Purpose Standards–Based Software Platform For Running Multimedia On Existing Networks," Cupertino, California, Jan. 22, 1996, 1 page, downloaded from WWW.

Precept Software Inc.—Press Release "Entertainment–Quality Video Comes To Networked Desktops As Precept Adds MPEG Support to IP/TV; Enhanced Browser Plug–In Lets Webmaster Customize Controls," Palo Alto, California, Jan. 27, 1997, 3 pages, downloaded from WWW.

MBONE Press Release, "30–Day Free Trial of Precept's Flashware Lets Users Try Out Mbone Viewer; Netscape Plug–In Support Also Added," Cupertino, California, Apr. 15, 1996, 2 pages, downloaded from WWW.

(List continued on next page.)

Primary Examiner—John A. Follansbee
Assistant Examiner—Tim Vo
(74) Attorney, Agent, or Firm—Beyer Weaver & Thomas LLP (57) ABSTRACT

Apparatus and methods for matching data rates is useful for a receiver receiving real-time data over a medium. Implementations feature a process establishing a buffer in a receiver; receiving source data from a source having a nominal source data rate, the received source data arriving at an incoming data rate that differs from time-to-time from the nominal source data rate; filling the buffer with source data as it is received at the incoming data rate and emptying the buffer to provide data for consumption in real time at a consumption data rate; setting a rate-matching factor M, the factor M affecting the rate at which the buffer is emptied; and tracking the level of data in the buffer and resetting the value of M to increase the rate at which the buffer is emptied when the buffer fills above a target range, and resetting the value of M to decrease the rate at which the buffer is emptied when the buffer empties below a target range.

40 Claims, 5 Drawing Sheets

OTHER PUBLICATIONS

Precept Software Inc.—Press Release "New Version of Precept's IP/TV Video–Distribution Software Delivers Full–Screen, Full–Motion Video To NT Desktops," Palo Alto, California Aug. 19, 1996, 2 pages, downloaded from WWW.

V. Kumar, "Real–Time Multimedia Broadcasts With the Internet Multicast Backbone," 8 pages, Jan. 23, 1998, downloaded from WWW.

Precept Software Inc.—Press Release, "Entertainment–Quality Video Comes to Networked Desktops As Precept Adds MPEG Support to IP/TV; Enhanced Browser Plug–In Lets Webmaster Customize Controls," Palo Alto, California, Jan. 27, 1997, 3 pages downloaded from WWW.

Precept Software Inc.—Press Release, "Precept's New IP/TV Software Delivers High–Quality Video To Remote Offices Without Compromising Quality," Palo Alto, California, Aug. 11, 1997, 2 pages, downloaded from WWW.

E. Roberts, "Multicast Video, Moving Pictures," Data Communications Magazine, Jan., 1998, 2 pages, downloaded from WWW.

J. McGarvey, "Precept's IP/TV Branches Out," Interactive Week, Aug. 12, 1997, 2 pages, downloaded from WWW.

Microsoft Corp., "Using DirectShow," 1997, 3 pages, downloaded from WWW.

Precept Software Inc.—Press Release, "Ipsilon Networks and Precept Software Demonstrate First Native Distributed IP Multicast Over ATM," Palo Alto, California, Apr. 2, 1996, 2 pages, downloaded from WWW.

* cited by examiner

REAL-TIME DATA RATE MATCHING ACROSS A MEDIUM

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to receivers of real-time data, such as receivers designed to receive high-quality video and/or audio data streams as one of multiple receiving computers on a network such as a local area network (LAN), a wide area network (WAN), a large corporate internetwork, or the Internet.

Video broadcasting is a way to distribute live or prerecorded video programming to large numbers of users over a digital network without creating network bottlenecks. Video broadcasting lets an organization set up corporate TV network accessible to an essentially unlimited number of users at their personal computers over enterprise LANs and WANs. In video broadcasting, a single video stream (including audio) is distributed using a technique known as IP Multicast, an IETF (Internet Engineering Task Force) standard. Any user wishing to join a multicast session can tap into it from a desktop personal computer at any time during the broadcast, and can leave the session at any time. This technique is highly efficient because it does not consume more bandwidth as the number of users increases.

A number of specifications have been published related to video broadcasting, and a number of broadcasting applications have been made available. These include the following Internet RFCs: RFC-1112, "Host Extensions for IP Multicasting", August 1989; and RFC-1889 "RTP: A Transport Protocol for Real-Time Applications", January 1996. Available applications include VAT, an audio conferencing application, and VIC, a video conferencing application, for which source code is available from the Network Research Group of Lawrence Berkeley National Laboratory (http://www-nrg.ee.lbl.gov/vat/ and http://www-nrg.ee.lbl.gov/vic/).

In video broadcasting, generally both video and audio are sent from a server to the client or clients over a transmission medium. The video and audio data are generally in a compressed form, and so must be decompressed on the client side. On the server side, the source of data may have video and audio interleaved together, either in a data file or from a live encoder.

The data can be transmitted either with or without splitting the audio data on the server. If the data are split on the server, each stream is transmitted independently to unique ports on the transmission medium. (A port is a logical channel in a communications system. The Internet TCP and UDP transport layer protocols use port numbers to demultiplex messages.) Otherwise, the data is split on the client, in either case generating packets of encoded audio and video data.

Audio and video compression create an encoded bitstream that is segmented into packets of encoded data. A transmission medium will generally also transmit data in packets, and typically one or more packets of compression encoded data can fit into a transmission medium packet.

The transmitted video data is synchronized to the audio data. Synchronization between video and audio is generally established by the use of time stamps, which are attached to each encoded data packet.

SUMMARY OF THE INVENTION

The methods and apparatus of the invention provide rate matching for real-time data across a transmission medium.

In general, in one aspect, the invention features apparatus and methods for matching data rates useful for a receiver receiving real-time data over a medium. Implementations of the invention feature a process establishing a buffer in a receiver; receiving source data from a source having a nominal source data rate, the received source data arriving at an incoming data rate that differs from time-to-time from the nominal source data rate; filling the buffer with source data as it is received at the incoming data rate and emptying the buffer to provide data for consumption in real time at a consumption data rate; setting a rate-matching factor M, the factor M affecting the rate at which the buffer is emptied; and tracking the level of data in the buffer and resetting the value of M to increase the rate at which the buffer is emptied when the buffer fills above a target range, and resetting the value of M to decrease the rate at which the buffer is emptied when the buffer empties below a target range.

Advantageous implementations of the invention may include one or more of the following features. The target range is reset when the buffer fills either above the target range or empties below the target range. The factor M is reset when the buffer fills either above the target range or empties below the target range. The factor M is reset when the buffer hits a target level within the target range. The consumption data rate is fixed and nominally equal to the source data rate. The source data is an IP Multicast video broadcast including video and audio data. The source data is MPEG compressed. The received source data is decompressed before application of the factor M. The received source data is decompressed after application of the factor M. When M is greater than one, the received data is consumed more quickly by deleting data from the received data; and when M is less than one, the received data is consumed more slowly by adding data to the received data. The incoming data rate and the consumption data rate experience jitter with respect to each other over time. The received source data includes audio and video data, and data is added to or deleted from the received audio data to create modified audio data and synchronizing the received video data to the modified audio data. The source data is received from a source that cannot be caused to change its rate of transmission by the receiver.

Among the advantages of the invention are one or more of the following. Operation of the invention is robust in the presence of substantial jitter and noise. Operation of the invention is robust when receiving data from a source whose data rate deviates over time from its nominal rate. Operation of the invention avoids uncontrolled drift in the amount of buffered data in the receiver. The amount of buffered data in a receiver can be controlled.

Other features and advantages of the invention will become apparent from the following description and from the claims.

DETAILED DESCRIPTION

Figure 1:
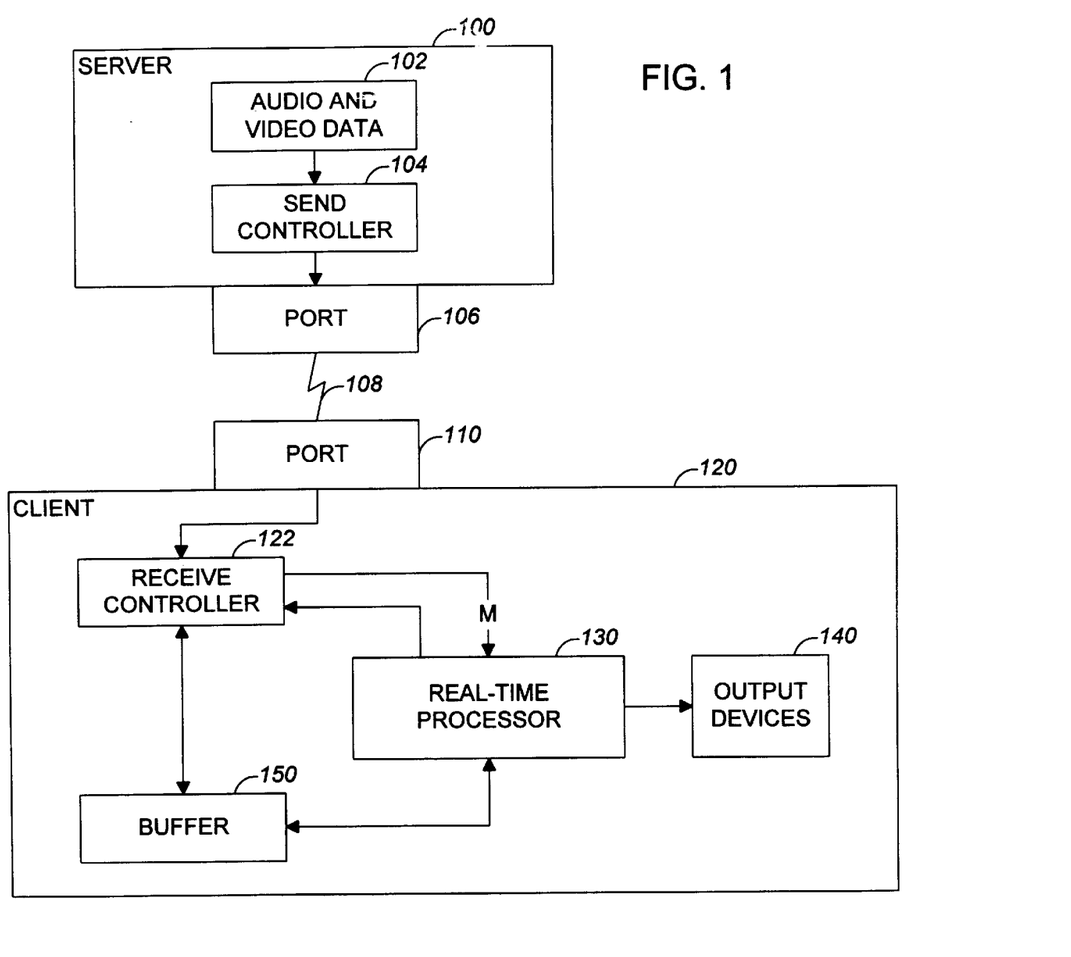
FIG. 1 is a block diagram of a client/server system suitable implementing the invention.

The invention may advantageously be implemented in the following familiar context. As illustrated in FIG. 1, a client/server system for real-time data transmission has at its core a server sending data, such as audio and video data from a source 102, over a transmission medium 108 to a client receiver 120. The receiver may be one of many receiving the same transmission, and therefore is not able to control the rate at which the data is sent.

A controller 104 on the server transfers data from a source to a port on the transmission medium. The controller uses a clock reference to push the data onto the transmission medium in real time. The data travels across the transmission medium to another port on the transmission medium associated with the receiver.

A controller 122 in the receiver transfers data from a port on the transmission medium to a buffer 150. A real-time processor 130 in the receiver takes data from the buffer and processes it in real time. During operation of such a real-time client/server system, the inter-arrival time of the incoming data at the receiver exhibits jitter. Two sources of this jitter are network jitter and any jitter introduced by the processes on the server which transmit the data. In addition, because of the practical limits of clock accuracy, the clock reference used by the sender and the clock reference used by the receiver will generally not be running at exactly the same rate.

Once the real-time processor 130 is started, it requires data at a predetermined consumption rate. The processor 130 must have access to a continuous, uninterrupted flow of data to operate properly. This imposes the constraints that the input buffer never underrun and that it never overrun.

Figure 2:
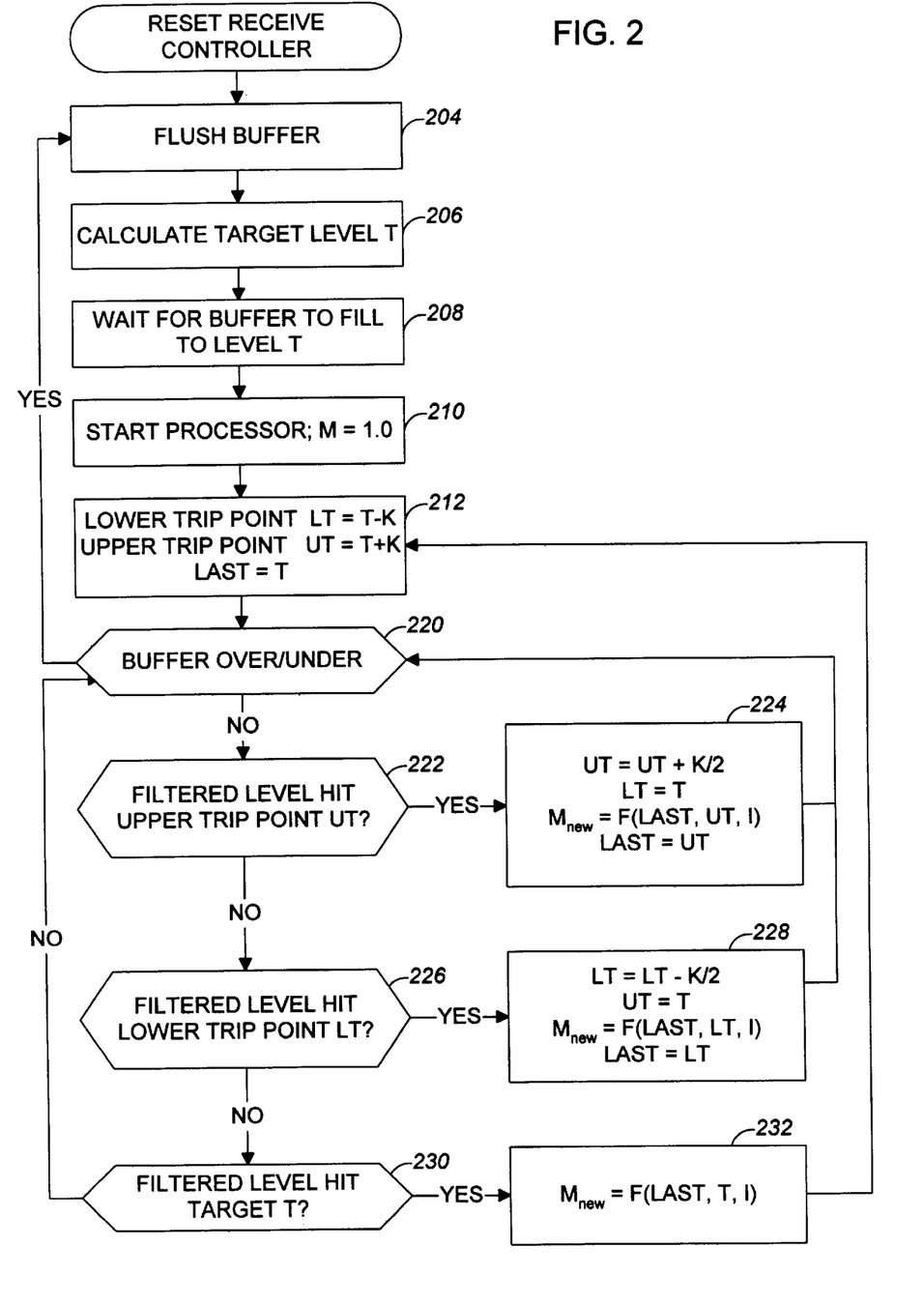
FIG. 2 is a flowchart showing steps of a control function in accordance with the invention.

In order to meet these constraints, the receive controller 122 performs the following functions, as shown in FIG. 2. First, a target level T of data in the buffer is set to a level that is capable of absorbing the jitter present on the incoming data to prevent underrun or overrun (step 206). The buffer is allowed to fill to that level (step 208). A rate-matching adjustment factor M is initialized to 1.0 and the real-time processor is started (step 120). This factor M is provided to the processor and causes it to speed up or slow down the consumption of data in order to match the rate at which data is being received in the buffer. The rate-matching adjustment M is a scale factor that in essence causes the processor to process data M times faster than the clock reference used by the processor. In operation, the receive controller keeps the average buffer level at a desired target to absorb jitter.

If the processor fails to match the incoming data rate, the buffer will periodically underrun or overrun, each time requiring the controller to stop, reset, and restart the processor (steps 220 and 204). Accidental underruns or overruns might happen for two reasons. First, the client might experience deviations in network inter-arrival time beyond the typical anticipated maximum, causing the buffer to overrun or underrun. Second, the receive controller might be unable to match the rate of the incoming data to the real-time processor correctly or quickly enough to prevent underrun or overrun.

The receive controller calculates a minimum buffer level required to keep the buffer from underrunning. The receive controller can decide on a value in advance, and optionally may modify the value by observing the jitter in the data stream over time. The target buffer level T is set to this minimum level plus a safety margin (step 206). This is a conventional calculation and is found, for example, in the above-mentioned VIC and VAT source code. To start the client with the target buffer level, the receive controller waits until the buffer fills up to the level desired (step 208), and then starts the real-time processor (step 210).

After the real-time processor is started, the receive controller calculates the rate-matching factor M by observing how the buffer level changes. The buffer level is measured in seconds of data. After startup, the buffer level is affected by two influences. Network jitter may cause wild short-term fluctuations; and rate mismatch will cause a long-term, gradual upward or downward creep.

The receive controller masks out the short-term jitter fluctuations and extracts only the long-term creep. It has been found that the network jitter component has a statistical profile that sometimes causes the buffer level to drift gradually up or down, which the receive controller can misinterpret as mismatch drift.

To prevent this misinterpretation, two techniques are employed. A low pass filter with a very low cutoff frequency is used to mask the jitter component. The low pass filter is configured to have a time constant that is as long as possible, but short enough to observe the buffer change due to rate mismatch. A time constant of one second for a data rate of 200 kilobits per second would be appropriate. To further filter out network jitter, the receive controller acts only after the filtered level has deviated from the target by a large amount, set as an upper trip level and a lower trip level (step 212). The controller waits until the filtered level reaches one of these preset levels before performing a rate-matching adjustment (steps 222–232).

As has been mentioned, the receive controller chooses a target buffer level of T seconds (step 206). The controller attempts to keep the average buffer level as close to T as possible by modifying the factor M. The controller sets boundary trip points a distance K seconds above and below the target level (step 212). The controller waits until the filtered level hits one of the trip points (steps 222, 226, 230). If the filtered level creeps from target level T to trip point level V in a period of I seconds when using M=1.0, the factor M is changed to a new value $$M_{new}=(I+2V-2T)/I.$$

This new value will overcompensate for the rate mismatch to get the buffer level back to T in time I, the same time it took to deviate from T to V. It has been found that attempting to return the level to T any faster invites instability. When the level returns to T, the factor M is readjusted to maintain a constant buffer level (steps 230, 232).

In the most general case, if the buffer level changes from U to V over a time interval of length I with a rate-matching factor $M_{old}$, then to cause the level to arrive at T over the next interval of length I, the real-time processor must consume I−((U−V)+(T−V)) seconds worth of data over the interval I, and the new rate-matching factor $M_{new}$ is $$M_{new}=((I-((U-V)+(T-V)))*M_{old})/I,$$

which reduces to $$M_{new}=((I+2V-U-T)*M_{old})/I,$$

(function F in steps 224, 228, 232). When the level hits a trip point and the rate-matching factor is changed, a new set of trip points is established. There are two cases.

Case 1. If the level is deviating away from the target and hits a trip point (yes branch of decision steps 222 and 226), then the trip point that was hit is moved further away from the target level for the next interval, because if the controller incorrectly selects the new rate-matching factor, the filtered level could deviate even further away from the target level (steps 224, 228). However, if this further deviation occurs, it is desirable to detect it as soon as possible to prevent overrun or underrun of the buffer. Therefore, the distance from the old trip point which was hit to the new trip point is K/2 instead of K, and the trip point that was not hit will be set to the target level (steps 224, 228).

Case 2. If the level was creeping back up to the target level and hits a trip point corresponding to the target level T (yes branch of decision step 230), then M is recalculated as has been described (step 232) and the trip points are reset back to their original values of K above and below the target T (step 212).

The controller also handles the case where the buffer underruns or overruns (yes branch of decision step 220). In this case the controller stops the real-time processor, flushes the buffer, waits for the target level to be met, sets M=1.0, and then restarts the processor (steps 204–210).

The controller constantly monitors the instantaneous buffer level for underrun or overrun. However, the filtered buffer level may be checked less frequently. If $I_{min}$ is the expected minimum time taken for the level to creep a distance of K, then the controller may check the filtered level about every $I_{min}/100$. Checking the filtered level infrequently allows the controller to be implemented using a computationally-intensive FIR (finite impulse response) low-pass filter without adverse effect on other computational tasks. FIR filters are advantageous for the controller because they are more stable than IIR (infinite impulse response) filters.

Figure 3:
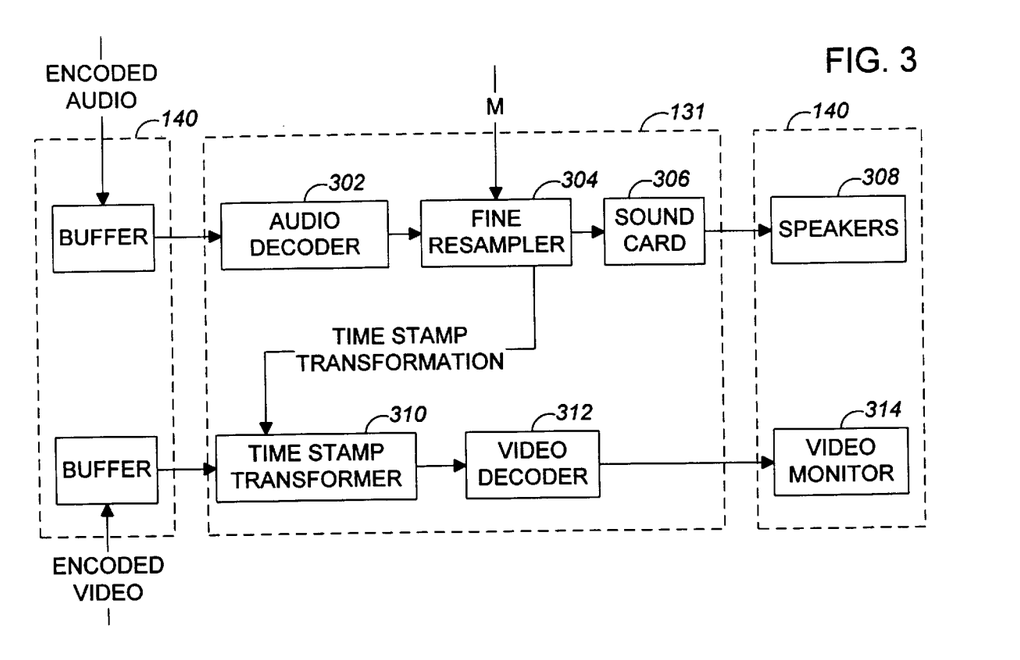
FIG. 3 is a block diagram of one implementation of the real-time processor shown in FIG. 1.

As shown in FIG. 3, in one architecture 131 for real-time processor 130 (of FIG. 1), the audio data is decoded before the rate-matching factor M is applied. Incoming encoded audio and video data is stored in buffer 150, as has been mentioned. The data may be stored in separate areas, as illustrated, or intermixed. The audio data is decompressed by an audio decoder 302, which may advantageously be implemented as a computer program, of which many are available. The DirectShow program products available from Microsoft Corporation of Redmond, Wash. are suitable for this purpose.

Receiving decompressed data, a scaling unit implemented as a fine resampler 304 performs the scaling necessary to give effect to the factor M. The fine resampler uses the data values in its input stream to interpolate new data values corresponding to a different sample rate. Resampling algorithms are well known, and algorithms that use more accurate interpolation are better able to preserve the continuous-time, band-limited representation of the sampled data and to limit the added noise, at the cost of computational complexity. The resampled audio data is then provided to a conventional sound card or other sound output device, which generates the signals to drive an audio output device, such as speakers 308.

Figure 4:
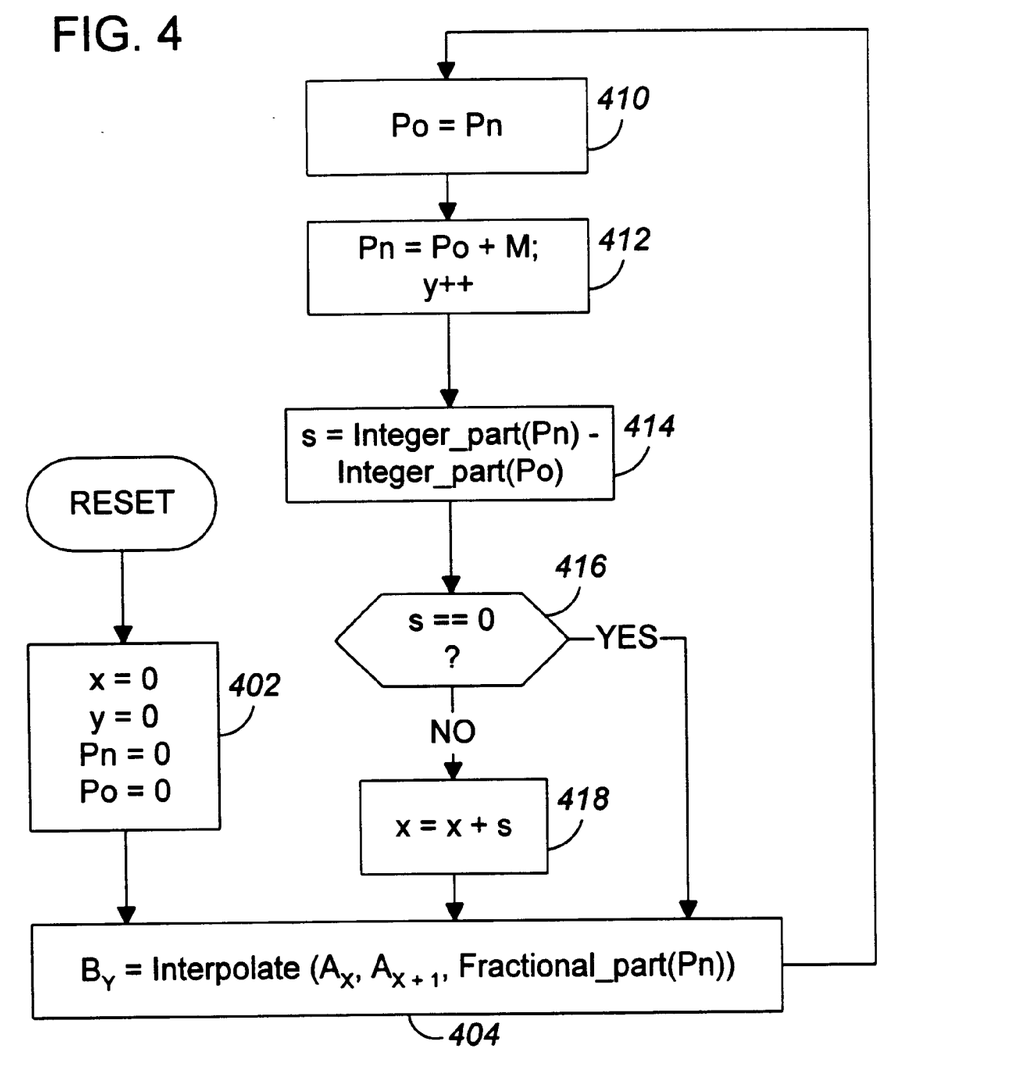
FIG. 4 is a flowchart of a resampling process implemented in the processor shown in FIG. 3.

FIG. 4 is a flowchart showing the process implemented in a fine resampler suitable for use in the real-time processor 131. In the implementation shown in the flowchart, the process simply selects the data value in the input stream that is nearest to the interpolated location. The effect is either to delete or to double data values at periodic intervals and thereby either to shrink or to stretch the data stream.

The process initializes to zero the following data values: x, an input index; y, an output index; Po, the old point; Pn, the new point. The index x is an integer index to source data values in the input stream (which for simplicity of presentation is treated as a linear stream, without regard to the details of data buffer management), and y is an integer index to data values in the output stream. Po and Pn are floating point numbers that are used to step through the input axis, as will be described.

When a data point is required for output, it is provided by interpolator 404, which interpolates input values for an value Pn. In a simple implementation, the source data $A_x$ and $A_{x+1}$ at index x and x+1, respectively, is interpolated according to the fractional part of Pn. If it is greater than 0.5, $A_{x+1}$ is chosen; otherwise, $A_x$ is chosen. After a value is provided for output, the old place holder Po is reset to Pn (step 410); Pn is incremented by M and y is incremented by one (step 412); and s is calculated (step 414) as the difference between the integer parts of Pn and Po. The value is the integer number of index values x on the input axis that were covered by the step from Po to Pn. If this is zero, x is not incremented (yes branch from decision step 416) and the interpolation is performed as described; otherwise, x is incremented by s (step 418) so that new source values $A_x$ and $A_{x+1}$ are used in the interpolation step (step 404).

While the foregoing technique is sufficient, a more sophisticated and complex technique could be employed, in which the process waits until the input data experiences a zero crossing before doing the deletion or duplication, to make the added noise less objectionable to a human listener. At the cost of further complexity, more than two input data samples could be used to increase the accuracy of the interpolation.

As has been mentioned, the audio data has audio time stamps. The resampler transforms the audio time stamps to match the effect of the scaling operation. The video time stamps have a corresponding transformation applied to them, so that the video data remains synchronized to the audio. The audio resampler provides a history of the audio time stamp transformation to a time stamp transformer in the video path.

Returning to FIG. 3, the fine resampler 304 operates by applying a linear transformation to input time stamps to generate output time stamps, which transformation is represented by the parameters m and b of a line equation of the form y=mx+b. These parameters are provided to time stamp transformer 310 as transformation parameters. In addition, for each linear transformation, the time at which it became effective is also provided, so that time stamp transformer 310 has a history of the applicable linear transformations. Time stamp transformer 310 applies the appropriate transformation to incoming video time stamps and replaces them with the corresponding generated outgoing time stamps.

Figure 5:
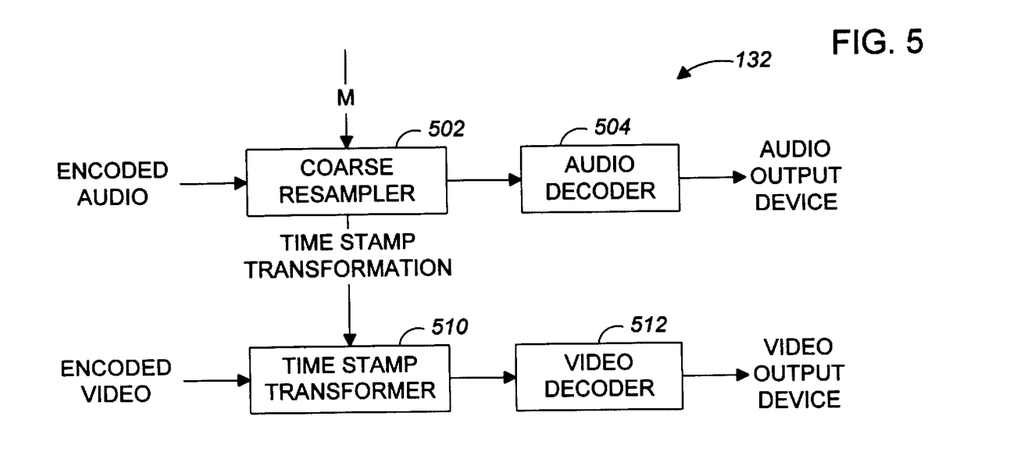
FIG. 5 is a block diagram of another implementation of the real-time processor shown in FIG. 1.

As shown in FIG. 5, in another architecture 132 for real-time processor 130 (FIG. 1), the audio data is decoded (by audio decoder 504) after the rate-matching factor M is applied. Such an architecture is appropriate when the audio decoder includes a hardware decompressor, such as an add-in peripheral card that decodes audio and drives speakers directly. A suitable card for this purpose is the REALmagic NetStream 1 MPEG decoder, available from Sigma Designs, Inc. of Fremont, Calif., which provides both the audio decoder 504 and the video decoder 512, and the output to drive the audio and video output devices. In this architecture, the decompressed audio data is essentially unavailable to an external scaling unit. Thus, the scaling is done by a coarse resampler 502 before the data goes to the hardware decoders. Time stamp transformer 510 operates as has been described in reference to time stamp transformer 310 (of FIG. 3).

Figure 6:
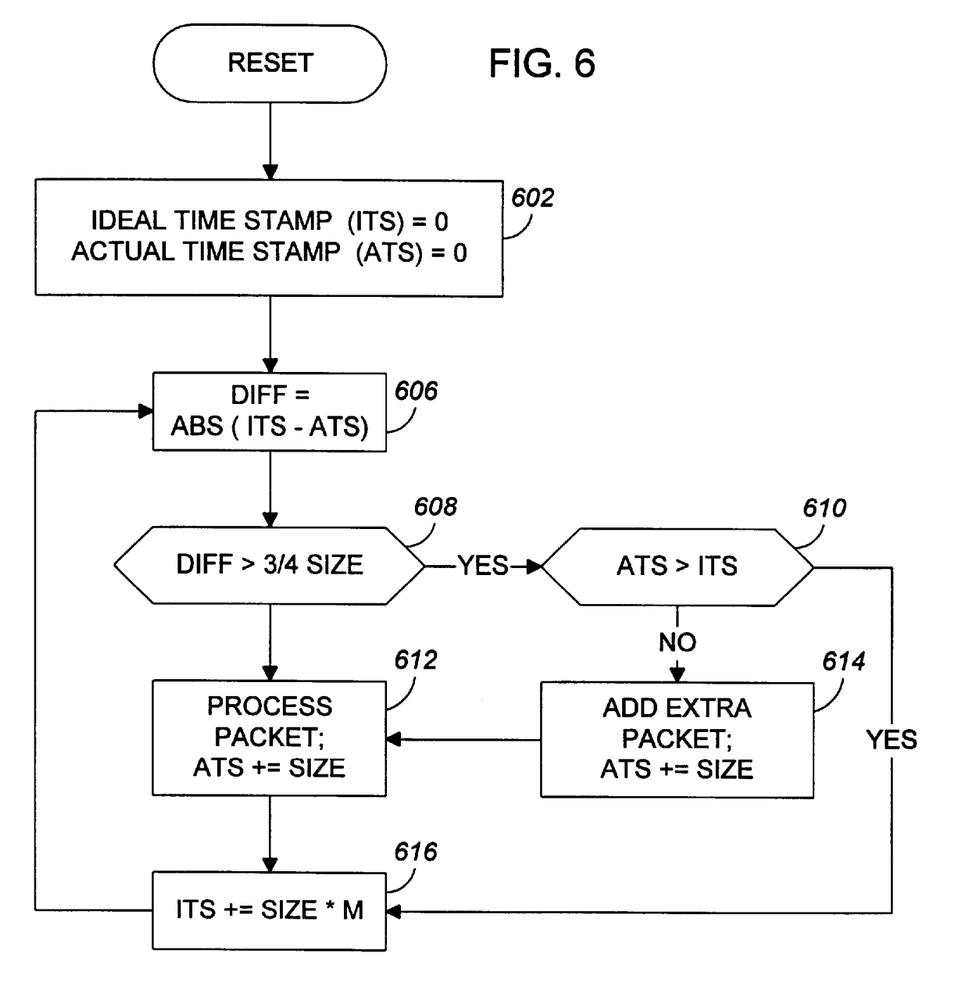
FIG. 6 is a flowchart of a resampling process implemented in the processor shown in FIG. 5.

A coarse resampling method for a coarse resampler is shown in FIG. 6. Audio compression algorithms generally encode audio into packets that represent a fixed duration of audio data. These audio packets are the atomic unit of the incoming data stream, and the resampling algorithm either deletes or doubles entire packets at a time, to shrink or stretch the data, respectively. The ideal time stamp (ITS) and actual time stamp (ATS) are first initialized (step 602). The process iterates when a packet arrives (loop to step 606). The size of the packet, measure in time, is SIZE. The absolute value of the difference between the ideal and the then-actual time stamps is calculated (step 606) and compared to 0.75×SIZE (decision step 608). If it is not greater, the incoming packet is simply processed and the actual time stamp is incremented by SIZE (step 612). Otherwise, if the actual time stamp is not greater than the ideal time stamp, an extra packet is added (step 614). In any event, the ideal time stamp is incremented by SIZE×M (step 616).

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits). Computers in which the invention is implemented are advantageously single-user computers configured to include audio and video output hardware suitable for presenting multimedia data to a user and network interface hardware and software suitable for receiving such data transmitted over a network connection, and in particular for receiving IP Multicast video broadcasts.

Other embodiments are within the scope of the following claims. For example, the order of performing steps of the invention may be changed by those skilled in the art and still achieve desirable results.

What is claimed is:

1. A method for matching data rates, comprising:
   establishing a buffer in a receiver;
   receiving source data from a source having a nominal source data rate, the received source data arriving at an incoming data rate that differs from time-to-time from the nominal source data rate;
   filling the buffer with source data as it is received at the incoming data rate and emptying the buffer to provide data for consumption in real time at a consumption data rate;
   setting a rate-matching factor M, the factor M affecting the rate at which the source data is emptied from the buffer; and
   tracking the level of data in the buffer and resetting the value of M to increase the rate at which the buffer is emptied when the buffer fills above a target range, and resetting the value of M to decrease the rate at which the buffer is emptied when the buffer empties below a target range.

2. The method of claim 1, further comprising:
   resetting the target range when the buffer fills either above the target range or empties below the target range.

3. The method of claim 1, further comprising:
   resetting the factor M when the buffer fills either above the target range or empties below the target range.

4. The method of claim 1, further comprising:
   resetting the factor M when the buffer hits a target level within the target range.

5. The method of claim 1, wherein the consumption data rate is fixed and nominally equal to the source data rate.

6. The method of claim 1, wherein the source data is an IP Multicast video broadcast including video and audio data.

7. The method of claim 1, wherein the source data is MPEG compressed.

8. The method of claim 1, wherein the source data is compressed and the method further comprises decompressing the received source data before applying the factor M.

9. The method of claim 1, wherein the source data is compressed and the method further comprises decompressing the received source data after applying the factor M.

10. The method of claim 1, wherein when M is greater than one, the received data is consumed more quickly by deleting data from the received data, and when M is less than one, the received data is consumed more slowly by adding data to the received data.

11. The method of claim 1, wherein the incoming data rate and the consumption data rate experience jitter with respect to each other over time.

12. The method of claim 1, wherein the received source data includes audio and video data, the method further comprising:
   adding or deleting from the received audio data to create modified audio data and synchronizing the received video data to the modified audio data.

13. The method of claim 1, wherein the source data is received from a source that cannot be caused to change its rate of transmission by the receiver.

14. The method of claim 1, wherein the buffer level is measured in units of time.

15. The method of claim 1, wherein, upon detecting an overflow or underflow of the buffer, the method reinitializes itself by flushing the buffer, setting a target level, a target range, and the factor M to one.

16. Apparatus comprising a computer-readable storage medium tangibly embodying program instructions for managing the receipt of data, the apparatus comprising instructions operable for causing a programmable processor to:
   establish a buffer in a receiver;

receive source data from a source having a nominal source data rate that may differ from time-to-time from the nominal source data rate;

fill the buffer with source data as it is received at the incoming data rate and to empty the buffer to provide data for consumption in real time at a consumption data rate;

set a rate-matching factor M, the factor M affecting the rate at which the buffer is emptied; and track the level of data in the buffer and reset the value of M to increase the rate at which source data is emptied from the buffer when the buffer fills above a target range, and to reset the value of M to decrease the rate at which the buffer is emptied when the buffer empties below a target range.

17. The apparatus of claim 16, wherein:

the consumption data rate is fixed and nominally equal to the source data rate;

the incoming data rate and the consumption data rate experience jitter with respect to each other over time;

the source data is an IP Multicast video broadcast of compressed video and audio data; and the apparatus further comprises instructions to:

reset the target range when the buffer fills either above the target range or empties below the target range; and reset the factor M when the buffer fills either above the target range or empties below the target range.

18. The apparatus of claim 17, the instructions being further operable to:

decompress the received source data before applying the factor M.

19. The apparatus of claim 17, the instructions being further operable to:

decompress the received source data after applying the factor M.

20. The method of claim 17, further comprising instructions to:

consume the received data more quickly by deleting data from the received data when M is greater than one; and consume the received data more slowly by adding data to the received data when M is less than one.

21. The apparatus of claim 17, further comprising instructions operable to:

add or delete from the received audio data to created modified audio data and to synchronize the received video data to the modified audio data.

22. In a system including a buffer arranged to temporarily hold data and supply said data to a processor that processes said data and outputs processed data, a method of controlling a data level in the buffer, the method comprising:

(a) tracking the level of said data in the buffer;

(b) based on the level of the data in the buffer, determining how to adjust the rate at which the buffer is emptied; and (c) instructing the processor to speed up or slow down its consumption of the data so that it empties the buffer more rapidly or more slowly depending upon the rate adjustment determined at (b).

23. The method of claim 22, wherein the processor resamples the data from the buffer, the method further comprising:

(d) in response to instructions to speed up or slow down its consumption of the data, changing a rate at which the processor resamples the data from the buffer to thereby speed up or slow down the processor's consumption of said data.

24. The method of claim 22, wherein determining how to adjust the rate at which the buffer is emptied comprises:

resetting a rate matching factor based on the level of the data in the buffer, which rate matching factor is used to provide instructions to the processor at (c).

25. The method of claim 22, wherein the processor processes the data from the buffer in real time.

26. The method of claim 23, wherein the data supplied from the buffer includes audio data and wherein the resampling is performed on the audio data.

27. The method of claim 23, wherein the data from buffer is compressed, the method further comprising:

decompressing the data from the buffer prior to resampling the data.

28. The method of claim 23, wherein the data from buffer is compressed, the method further comprising:

decompressing the data from the buffer after resampling the data.

29. The method of claim 24, further comprising using the rate matching factor to calculate a new resampling rate at which the processor resamples the data from the buffer.

30. The method of claim 26, wherein the data supplied from the buffer further comprises video data including video timestamps for synchronizing the video data to the audio data, the method further comprising:

(e) transforming the video timestamps to match the change in the rate at which the processor resamples the audio data, and thereby maintain the audio and video data in synchronization.

31. The method of claim 26, wherein the audio data includes audio timestamps, the method further comprising:

transforming the audio timestamps to match the change in the rate at which the processor resamples the audio data.

32. An apparatus for receiving and processing data from a source, the apparatus comprising:

(a) a buffer arranged to receive and temporarily hold data from the source;

(b) a processor arranged to receive and process said data from the buffer and to output processed data; and (c) a controller in communication with the processor and tracking the level of said data in the buffer to provide rate adjustment instructions to the processor, wherein the processor speeds up or slows down its consumption of the data so that it empties the buffer more rapidly or more slowly depending upon the rate adjustment instructions from the controller.

33. The apparatus of claim 32, further comprising:

a resampler that changes a resampling rate at which the processor resamples the data from the buffer to thereby speed up or slow down the processor's consumption of said data.

34. The apparatus of claim 32 further comprising at least one of an audio decoder and a video decoder.

35. The apparatus of claim 33, wherein the resampler changes the resampling rate in response to the rate adjustment instructions from the controller.

36. The apparatus of claim 33, wherein the resampler forms a component of the processor.

37. The apparatus of claim 33, wherein the data includes timestamps, the apparatus further comprising:

a timestamp transformer that transforms the timestamps to match the change in the rate at which the processor resamples the data.

38. The apparatus of claim 35, wherein the controller resets a rate matching factor based on the level of the data in the buffer, which rate matching factor is used to provide the rate adjustment instructions to the processor.

39. The apparatus of claim 37, wherein the data includes audio data having audio timestamps and the video data has video timestamps, and wherein the timestamp transformer transforms both the audio and video timestamps to match the change in the rate at which the processor resamples the data.

40. The apparatus of claim 37, wherein the timestamp transformer forms a component of the processor.

* * * * *